(12) United States Patent
Shteinhauz et al.

(10) Patent No.: US 6,584,836 B1
(45) Date of Patent: Jul. 1, 2003

(54) BIAS METHOD FOR IDENTIFYING AND REMOVING MACHINE CONTRIBUTION TO TEST DATA

(75) Inventors: Gregory David Shteinhauz, Akron, OH (US); Gregory Scott Johanning, Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/016,312

(22) Filed: Dec. 10, 2001

(51) Int. Cl.$^7$ .............................................. G01N 25/56
(52) U.S. Cl. ....................................................... 73/146
(58) Field of Search ................... 73/146, 1.59; 706/15, 706/38, 40, 41, 26, 388, 702; 382/706, 156; 702/145–148, 138, 41–43, 85, 95, 98, 105

(56) References Cited

U.S. PATENT DOCUMENTS

| | | | |
|---|---|---|---|
| 3,739,533 A | 6/1973 | Iida et al. ................... 51/281 R |
| 3,946,527 A | 3/1976 | Beer ......................... 51/281 R |
| 4,404,848 A | 9/1983 | Iwama et al. .................. 73/146 |
| 4,404,849 A | 9/1983 | Iwama et al. .................. 73/146 |
| 4,914,869 A | 4/1990 | Bayonnet et al. .......... 51/165 R |
| 5,263,284 A | 11/1993 | Wild ........................ 51/165.71 |
| 5,396,438 A | * | 3/1995 | Oblizajek ................... 364/552 |
| 5,396,817 A | * | 3/1995 | Rosensweig ................ 73/146.2 |
| 5,614,676 A | 3/1997 | Dutt et al. ..................... 73/660 |
| 6,065,331 A | 5/2000 | Fukasawa ..................... 73/146 |
| 6,257,956 B1 | * | 7/2001 | Shteinhauz et al. ............ 451/8 |

* cited by examiner

Primary Examiner—Hezron Williams
(74) Attorney, Agent, or Firm—David E Wheeler; Richard B O'Planick

(57) ABSTRACT

A method for predicting product performance uses sample data from a manufactured product under at least first and second different conditions, to establish transfer functions and a bias term simultaneously, which are then used to predict second condition properties for product when first condition properties are measured. In an illustrated embodiment, a method for predicting tire uniformity, preferably a harmonic component of force variation, preferably when operating at a high speed, is based on a tire's tested uniformity. A production tire's predicted tire uniformity is determined by a calculation using transfer functions applied to production tire measurement data obtained from factory floor testing equipment, which includes a factory floor balance checker and a factory tire uniformity machine, where the data are modified by a bias term that minimizes the machines contribution to the data. The transfer functions are determined by calculations involving a combination of measurements on a tire sample, which preferably comprises one or more tires of the same construction as the production tire for which predictions are desired. The combination of measurements, in the illustrated embodiment, includes measurements on a factory floor balance checker, on a factory floor tire uniformity machine, and on a test lab tire uniformity machine. The test lab tire uniformity machine is preferably operated at a speed higher than the factory floor tire uniformity machine, and most preferably at a speed approximately equal to the speed at which the predicted uniformity is desired.

9 Claims, 9 Drawing Sheets

FIGURE 3

BIAS_SOLVER: Transfer Function And Bias Determination

| | Mag | Phase | | Re | Im | | Slope= | 0.903 | | | | Vectoral Error |
|---|---|---|---|---|---|---|---|---|---|---|---|---|
| H1 | 1.12 | 11.0° | | 1.097 | 0.213 | | Std Error= | 8.833 | | | | Mag | Phase |
| H2 | 0.55 | 12.0° | | 0.536 | 0.114 | | R²= | 0.899 | | | H1 | 1.12 | 11° |
| H3 | 1.00 | 0.0° | | 1.000 | 0.000 | | | | | | H2 | 0.55 | 12° |
| | | | | | | | | | | | H3 | 1.00 | 0° |
| | | | | | | | Bias | | | | Bias | 26.71 | 25° |
| | | | | | Mag | Phase | | | | | Std Error | 8.83 |
| | Find Transfer Functions | | | | 26.71 | 25.1° | | | | | Slope | 0.90 |
| | | | | | Re | Im | | | | | R² | 0.8993 |
| | | | | | 24.18 | 11.4° | | | | | | |

| Input 1 | | Input 2 | | Input 3 | | Output | | Predicted | | Sum of Squares | |
|---|---|---|---|---|---|---|---|---|---|---|---|
| Mag | Phase | Mag | Phase | Mag | Phase | Mag | Phase | Mag | Phase | Re | Im |
| 48.4 | 164 | 48.5 | 71 | | | 67.4 | 145 | 49.7 | 122.2° | 842.8 | 14.3 |
| 26.2 | 33 | 35.2 | 44 | | | 76.6 | 42 | 73.7 | 40.3° | 0.9 | 11.3 |
| 65.3 | 240 | 5.0 | 346 | | | 48.4 | 295 | 57.9 | 273.3° | 101.0 | 127.1 |
| 45.4 | 327 | 29.2 | 0 | | | 84.6 | 366 | 86.9 | 366.9° | 6.0 | 0.9 |
| 44.5 | 200 | 33.3 | 78 | | | 9.6 | 167 | 18.9 | 167.8° | 92.4 | 0.1 |
| 33.6 | 226 | 24.1 | 65 | | | 20.0 | 334 | 9.9 | 312.5° | 126.8 | 2.3 |
| 6.0 | 267 | 33.5 | 54 | | | 43.9 | 20 | 39.0 | 33.5° | 76.0 | 43.5 |
| 12.9 | 231 | 34.2 | 31 | | | 38.1 | 40 | 33.1 | 20.2° | 3.6 | 170.3 |
| 35.4 | 272 | 17.8 | 167 | | | 30.1 | 317 | 36.6 | 310.4° | 0.8 | 45.2 |
| 33.0 | 289 | 20.9 | 34 | | | 46.9 | 331 | 52.2 | 346.5° | 62.0 | 131.1 |
| 23.6 | 363 | 22.6 | 40 | | | 62.7 | 3 | 62.5 | 21.6° | 30.3 | 401.0 |
| 55.6 | 301 | 35.1 | 29 | | | 82.2 | 6 | 83.3 | 344.6° | 2.8 | 860.1 |

BIAS METHOD FOR IDENTIFYING AND REMOVING MACHINE CONTRIBUTION TO TEST DATA

FIELD OF THE INVENTION

The present invention generally relates to the measurement of tire uniformity with a tire uniformity machine, and more specifically to an improvement in prediction made possible by the removal of machine contributions to the measurement data.

BACKGROUND OF THE INVENTION

In the art of manufacturing pneumatic tires, rubber flow in the tire mold or minor differences in the dimensions of the belts, beads, liners, treads, plies of rubberized cords, etc., sometimes cause non-uniformities in the completed tire. Non-uniformities of sufficient amplitude will cause force variations on a road surface against which the tires roll, producing vibration and noise. When such variations exceed an acceptable maximum level, the ride and handling of a vehicle utilizing such tires will be adversely affected.

Tire uniformity machines are used to monitor the quality of the tire production process and may guide or incorporate corrective measures such as grinding to improve the balance and uniformity of a tire. In general, a tire uniformity machine subjects a tire to normal conditions of mounting, pressurization, rotation and load while collecting measurement data on variations of deflection, forces, moments, and velocity. A tire uniformity machine typically includes an assembly for rotating a tire against the surface of a rotating loading wheel. In this testing arrangement, the loading wheel is moved in a manner dependent on the forces exerted by the rotating tire and those forces are measured by appropriately placed measuring devices. When a tire being tested yields unacceptable results, shoulder and/or center rib grinders are used to remove a small amount of the tire tread at precisely the location of the non-uniformities detected by the measuring devices. In a sophisticated tire uniformity machine, the measurements are stored and interpreted in digital form by a computer, and rubber is removed from the tire tread using grinders controlled by the computer. Examples of machines utilizing these methods are disclosed in U.S. Pat. Nos. 3,739,533; 3,946,527; 4,914,869 and 5,263,284.

Unavoidably, tire uniformity machines are not themselves perfectly uniform, and tire uniformity measurement signals may include an erroneous contribution from the tire uniformity machine itself. In effect, minor variations in the design, construction and operation of a tire uniformity machine contribute to variations of deflection, forces, moment or velocity, which contaminate the tire uniformity measurements with a machine contribution.

As noted by U.S. Pat. No. 4,404,848 ('848), it is often the case that measured values contain errors due to rotation deflections of the rims that grip the inspected tire and/or the load wheel of the tire uniformity machine. In addition, small deflections occur due to the deterioration of parts, for example, by rust or by bruises that occur during use of the inspecting machines. A method to correct these types of errors is disclosed by the '848 patent wherein the radial runout of the load wheel is measured without a tire in place, to obtain an erroneous deflection signal. The erroneous deflection signal is then multiplied by the spring constant of the measured tire and subtracted from the measured value of the radial force obtained from the tested tire.

U.S. Pat. No. 4,404,849 describes a method for correcting errors of measurement due to variations in tire pressure in a tire uniformity inspecting operation.

U.S. Pat. No. 5,614,676 ('676) describes a method of vibration analysis for tire uniformity machines by using signals from load cells when the machine idles. The signals are sent to a computer that outputs an alarm signal when the amplitude of vibration at selected frequencies exceeds acceptable levels.

U.S. Pat. No. 6,257,956, incorporated herein by reference, teaches a method for correcting errors of measurement made on tire uniformity machines by identifying and removing machine contributions from tire uniformity measurements. The method of the patent includes calculating the effect of the average machine contribution to the measured values of production tire uniformity as measured by a tire uniformity machine. The machine contribution signal is subtracted from the production tire measurement signals to provide a more accurate basis to evaluate the uniformity of a production tire and guide, as necessary, corrective measures. The method primarily includes the steps of performing one or more tire uniformity measurements on a test tire, and storing the average test tire uniformity measurement data to use as an indicator of the average machine contribution to tire uniformity measurements. When a production tire is measured on the same tire uniformity machine, the stored machine contribution data/signal is subtracted from the production tire data/signal to produce a corrected production tire uniformity measurement.

U.S. Pat. No. 5,396,438 (K. L. Oblizajek, assigned to General Motors Corporation), incorporated in its entirety by reference herein, discloses a method of manufacturing tires which preferably includes measurement of two or more low speed tire parameters, by determining transfer functions which are used to calculate predicted highway speed (high speed) force variations, and then comparing high speed values predicted for production tires to predetermined criteria for controlling manufacture of the production tires.

As described in application Ser. No. 09/817,983 filed Mar. 27, 2001, incorporated herein by reference, during the typical tire manufacturing process, factory floor measurements of tire uniformity are performed on tire uniformity machines ("TUMs") which are used to monitor the quality of the tire production process and may guide or incorporate corrective measures such as grinding to improve the balance and uniformity of a tire. A factory floor TUM is a low speed unit, typically operated at 60 rpm (revolutions per minute) which corresponds to less than 10 Kph for a typical passenger car tire. The low speed TUM is also known in the industry as a "low speed uniformity machine" or "LSU". As the tire is rotated, it is measured and ground simultaneously. In a sophisticated, low speed production tire uniformity machine, such as a Model No. D70LTX available from the Akron Standard Co. of Akron Ohio, the force measurements are interpreted by a computer and rubber is removed from the tire tread using grinders controlled by the computer.

Once a tire undergoes correction for force variations in a TUM, it is common manufacturing practice to remove the tire from the TUM and place the tire in a balance machine to measure the amount of imbalance of the tire. Typically, the tires are mounted in the balance machine in a manner similar to that of the tire uniformity machine and inflated to a preset pressure. The static (single-plane) and couple (two-plane) imbalances are measured by one of a variety of well-known methods. When a tire is found to be imbalanced to an unacceptable level, the tire is scrapped.

In the art, forces on a tire which is rolling under load on a load bearing surface are commonly broken down into three orthogonal components which will be primarily referred to herein as: radial, lateral, and tangential. Radial forces act in the tire's radial direction, i.e., perpendicular to the tire's axis of rotation. Radial forces are strongest in the vertical direction (e.g., wheel "hop") as the tire interacts with the load bearing surface, but may also have a horizontal (fore-aft, or "surge") component due to, for example, the radial centrifugal force of a net mass imbalance in the rotating tire. Lateral forces act in a direction parallel to the tire's axis of rotation, and generally occur where the tire's surface touches the load-bearing surface. Lateral force causes either tire wobble or a constant steering force. Tangential or fore-aft force is experienced at the surface of contact between the tire and the load bearing surface in a direction both tangential to the tire's outer circumference (e.g., tread surface) and perpendicular to the tire's axis of rotation (thus also perpendicular to the radial and lateral forces). Tangential force variations are experienced as a "push-pull" effect on a tire, which can be analogized to the sensation of a wheel barrow traveling over a bump in the road, i.e. increased force as the wheel barrow is pushed up the bump, and decreased force as the wheel barrow travels down the bump.

Of the three types of force (radial, tangential and lateral), tangential force variation (TFV) is the most speed dependent, and practically cannot be measured on a typical production low speed tire uniformity machine, which operates at a speed such as 60 rpm. Tangential force variation can only be effectively measured at highway speeds using a high speed, laboratory tire uniformity machine, such as a Model HSU-1064, available from the Akron Standard Co. of Akron Ohio. The high speed TUM is also known in the industry as a "high speed uniformity machine" or "HSU".

Since there are three orthogonal forces being considered, there are three separate force variation signals: radial force variation (RFV), lateral force variation (LFV), and tangential force variation (TFV). Fourier transformations of each of the three force variation signals will produce families of harmonic components (some of which may have a zero magnitude) for each of the three signals. The first harmonic of radial force variation can be abbreviated as "R1H" for Radial $1^{st}$ Harmonic; the first harmonic of lateral force variation can be abbreviated as "L1H" for Lateral $1^{st}$ Harmonic; and the first harmonic of tangential force variation can be abbreviated as "T1H" for Tangential $1^{st}$ Harmonic. Similarly, second harmonic components can be abbreviated as R2H, L2H, and T2H, for radial, lateral and tangential $2^{nd}$ harmonics, respectively; and so on for third and higher harmonics of the three force variations.

U.S. Pat. No. 6,065,331 (K. Fukasawa, assigned to Bridgestone Corporation), incorporated in its entirety by reference herein, discloses a method and apparatus for predicting a higher-order component ($2^{nd}$ and higher harmonics) of high speed uniformity of a tire, and a method of manufacturing tires utilizing the method and apparatus. The method preferably comprises measuring, for a single tire within a tire lot, a low-speed dynamic stiffness at a frequency corresponding to a higher-order component to be predicted when the tire rolls at a low speed, and a high-speed dynamic stiffness at a frequency corresponding to the order when the tire rolls at a high speed, and then using the dynamic stiffness measurements in an Formula to predict high speed RFV or TFV from low speed measurements of RFV and effective rolling radius variation.

U.S. application Ser. No. 09/817,983 teaches a method for predicting a harmonic component of force variation comprising the steps of: collecting a first set of measurement data for a tire on a factory floor balance checker, and on a factory floor tire uniformity machine which is operated at a first speed; collecting a second set of measurement data for the tire on a test lab tire uniformity machine which is operated at a second speed higher than the first speed; determining transfer functions from the first set of measurement data and the second set of measurement data; collecting a third set of measurement data for a production tire on a factory floor balance checker and on a factory floor tire uniformity machine; and predicting the harmonic component of force variation for the production tire rotating at a prediction speed by applying the transfer functions to the third set of measurement data.

The method further comprises the step of collecting, as part of the first set of measurement data, data on a factory floor balance checker, which determines single plane balance in terms of single plane net imbalance mass and rotational angular location of the net imbalance mass. Alternatively, the method further comprises the step of collecting part of the first set of measurement data on a factory floor balance checker which determines two plane balance in terms of a net imbalance mass and rotational angular location of the net imbalance mass for each of two circumferential planes of the tire being balance checked.

The method further comprises the step of collecting the third set of measurement data for the production tire on the same factory floor balance checker and on the same factory floor tire uniformity machine as were used for collecting the first set of measurement data for the tire sample; and collecting the third set of measurement data while operating the factory floor tire uniformity machine at the first speed.

Although the method described in U.S. application Ser. No. 09/817,983 significantly improves the prediction for high speed uniformity, the prediction works better for some tire constructions than for others. In the conception of the invention, it was theorized that vibrations in the tire uniformity machine interact with certain tire constructions more than others, to cause errors in the predictions for those certain constructions.

DEFINITIONS

"Axial" and "Axially" means the lines or directions that are parallel to the axis of rotation of the tire.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cyclical data" means data having repeating characteristics with a regular periodic frequency or time interval.

"Lateral" means a direction going from one sidewall of the tire towards the other sidewall of the tire, generally across the tread perpendicular to the tire circumference.

"Ply" means a cord-reinforced layer of rubber coated radially deployed or otherwise parallel cords.

"Radial" and "radially" mean directions radially toward or away from the axis of rotation of the tire.

"Tangential" and "Tangentially" refer to segments of circular curves that intersect at a point through which can be drawn a single line that is mutually tangential to both circular segments.

"Tread," means the ground contacting portion of a tire.

SUMMARY OF THE INVENTION

A method for predicting product performance using sample data from a manufactured product comprises the steps of (a) collecting first measurement data on a product sample at a first condition, (b) collecting second measurement data for the product sample at a second condition, (c) establishing transfer functions from the first measurement data and the second measurement data and simultaneously calculating a bias term representing test machine contributions to the data, (d) collecting third measurement data for product using the first condition, and (e) predicting the product's performance for the second condition by applying the transfer function and bias term to the third measurement data.

In an illustrated embodiment, a method for predicting a harmonic component of force variation comprises the steps of collecting a first set of measurement data for a tire sample on a factory floor balance checker and on a factory floor tire uniformity machine which is operated at a first speed, collecting a second set of measurement data for the tire sample on a test lab tire uniformity machine which is operated at a second speed higher than the first speed, determining transfer functions and a bias term from the first set of measurement data and the second set of measurement data, collecting a third set of measurement data for a production tire on a factory floor balance checker and on a factory floor tire uniformity machine operating at the first speed, and predicting a harmonic component of force variation for a production tire rotating at a second speed by applying the transfer functions and bias term to the third set of measurement data.

The illustrated method is characterized by the step of selecting the tire sample as a sample set of one or more tires of the same construction which is substantially the same as the construction of the production tire for which prediction is desired, and by collecting the first set of measurement data on a factory floor balance checker which determines single plane balance in terms of single plane net imbalance mass and rotational angular location of the net imbalance mass.

Alternatively, the method is characterized by the step of collecting the first set of measurement data on a factory floor balance checker which determines two plane balance in terms of a net imbalance mass and rotational angular location of the net imbalance mass for each of two circumferential planes of the tire being balance checked.

In a specific embodiment, the method is characterized by the steps of collecting the third set of measurement data for the production tire on the same factory floor balance checker and on the same factory floor tire uniformity machine as were used collecting the first set of measurement data for the tire sample, and collecting the third set of measurement data while operating the factory floor tire uniformity machine at said first speed.

The invention also includes a method of correlating test data, measured on more than one machine, which includes measuring more than one set of data on the same sample of test articles under the same test conditions, calculating transfer functions and bias between the more than one set of data, and calculating the coefficient of determination $R^2$ between a first set of test data and at least a second set of the data corrected by removing the bias term.

Additionally, the invention includes a method of tuning a test machine comprising using the bias between two sets of data measured on a highly precise master machine and the test machine as a measure of the precision of the test machine and adjusting the test machine until the bias level with respect to the master machine is within target parameters.

The invention further includes a method of diagnosing an imperfection in a test machine comprising analyzing changes in the bias term as correlated with changes in test speed wherein when the bias is growing in proportion to the square of the rotational velocity of the machine, then an unbalance exists in the machine, and wherein if bias is growing with speed in a linear fashion, there is a geometrical imperfection in the test machine.

It is an object of the invention to remove biases in the testing machine from calculation for prediction of product performance.

Other objects of the invention will be apparent from the following description and claims.

BRIEF DESCRIPTION OF THE DRAWINGS

The invention will be described by way of example and with reference to the accompanying drawings in which:

FIG. 3 illustrates a spreadsheet showing the parameters used in prediction in the method of the invention.

DETAILED DESCRIPTION OF THE INVENTION

Figure 1:
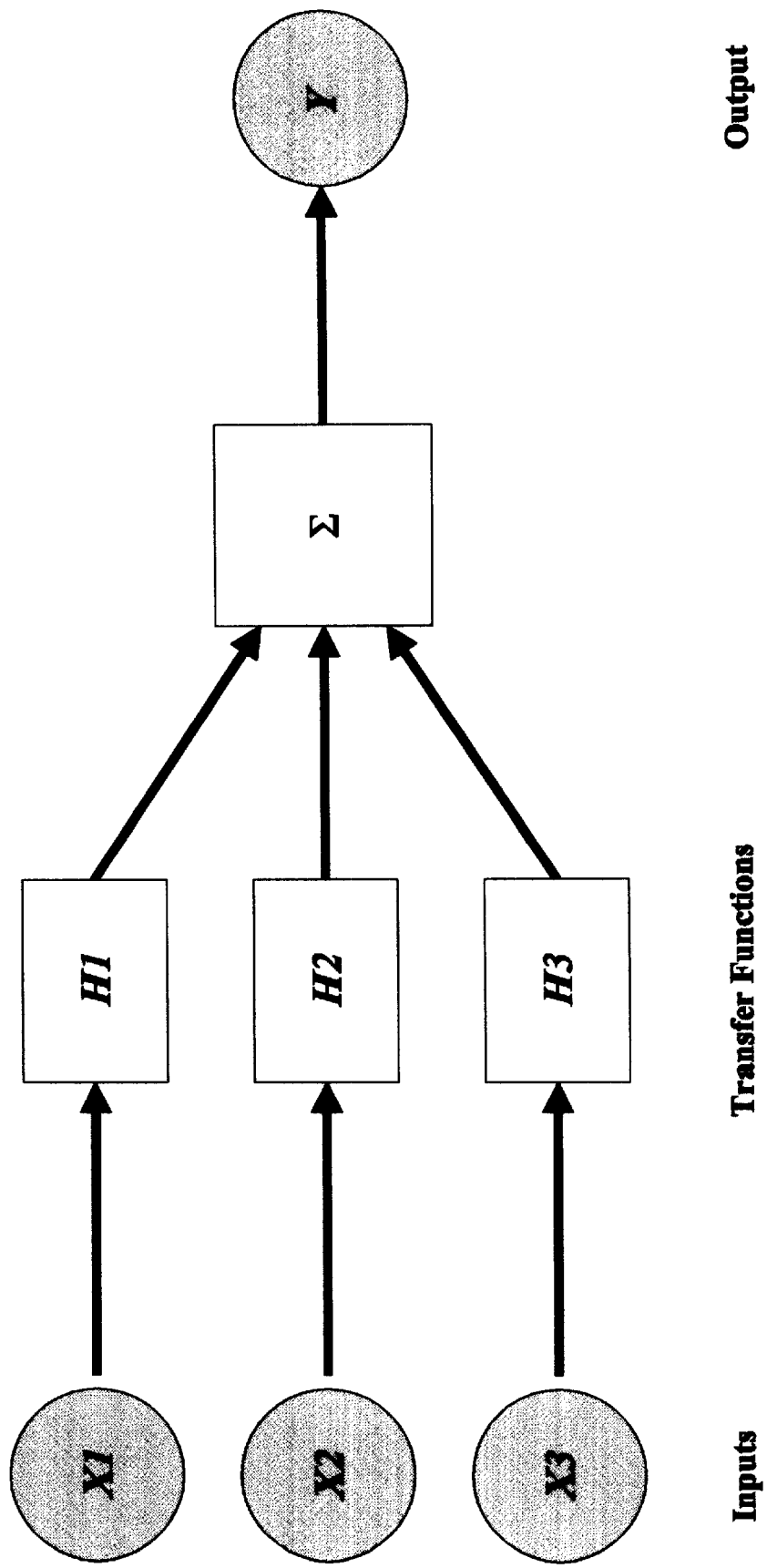
FIG. 1 illustrates a block diagram of a prior art method of predicting high speed uniformity (HSU).

There are usually some variations in the makeup and maintenance of different test machines that cause noise in the data that is obtained on the machines. If those variations can be identified and removed from the data, what remains is data specific to the item being tested. The method of the invention includes a means for removing contributions of testing machines from test data collected. The method can also be used to identify machines that are not maintained properly as well as to identify machines that are constructed differently from each other. The bias method of the invention can be used to make sure test data can be correlated between different machines.

The invention is illustrated specifically as it relates to force variation machines for testing tires. Those skilled in the art will recognize that the invention can be used to remove the machine bias from other types of testing machines.

In Ser. No. 09/817,983, the transfer functions were determined by measuring inputs and outputs on the sample tires, and finding the transfer functions that minimize the average differences between measured and predicted outputs for the sample tires. As illustrated below, "bias" refers to a variation that is caused by an interaction between the test machine contributions (e.g. geometrical imperfections, imbalance) and the article being tested, as opposed to the difference between data obtained from the low speed testing machines and the high speed testing machines. The bias is found basically by recalculating the outputs using a term that improves correlation between predicted and measured outputs for the sample of tires tested, and recalculating until the correlation is optimized. Accordingly, the "bias" will vary according to the article being tested on a specific machine.

In a method of finding machine contribution in tire uniformity testing, the method consists of combining all the machine contributions of the input and output data (channels) into a single bias term in a multiple input-single output model. The bias term is then computed together with transfer functions connecting the inputs and the output. The transfer functions and the bias term are defined as complex (vector) values, and are found by minimizing prediction error or by other means of optimization.

The method has been applied to four types of data: (a) simulated multi-input-single-output with option to add controlled bias and noise; (b) high speed uniformity (HSU) data, measured on different machines, (c) low and high speed uniformity data, used for high speed uniformity prediction, as described in pending U.S. Pat. application Ser. No. 09/817,983, and (d) data from a special high speed uniformity (HSU) test with added controlled imbalance and spindle eccentricity (as added biases).

In all four cases, the method shows a clear ability for extracting bias, improving the transfer functions, reducing the standard error, increasing the coefficient of determination ($R^2$), and separating test data from biased data.

The benefits of the new method are easier identification and removal of machine contributions, higher quality of the uniformity data, improved correlation between machines, and improved prediction.

In correlating the results from different uniformity machines, as well as predicting high speed uniformity, we can represent the methodology, connecting the measured inputs and outputs by the following formula:

$$Y = \sum_{i=1}^{n} H_i * X_i \quad (1)$$

Where
   Y is a complex tire uniformity characteristic, such as high speed radial or tangential force variation, obtained as an output
   $X_i$ is a complex tire uniformity characteristic such as harmonics of radial or tangential force variations, determined as an input
   $H_i$ is a complex coefficient, called transfer function, connecting the given input and the output.
   n is the number of inputs used in the model
   i is an index of the input, i=1 . . . n
   For example, for the number of inputs n=3, the following formula is used:

$$Y = X_1 * H_1 + X_2 * H_2 + X_3 * H_3$$

A block diagram, illustrating the approach is shown in FIG. 1.

Formula (1) is used for finding the transfer functions (identification) and finding the output (prediction) as follows:
   a sample of tires of a given construction is assembled and submitted to at least two uniformity tests, resulting in measuring one or more input parameters from test 1, and one output parameter from test 2;
   the model (1) is submitted for an identification procedure, resulting in the transfer functions $H_1$, $H_2$ and $H_3$
   new tires of the same construction are submitted to test 1 only, and the input parameters from test 1 are used along with the transfer functions to predict the outputs, instead of running test 2 (prediction).

The described procedure can be used for predictions of the high speed uniformity of tires from the measurement of low speed parameters and other measurements, or for correlating the tire uniformity results obtained from measurements on different machines.

The quality of the procedure depends on the quality of input and output data, which could contain two types of erroneous inputs, as follows:

1) Non-synchronized errors, a component of measured data, which occur independent of tire rotation, such as load and inflation pressure variations, 60 Hz noise of the power supply line, instrumentation noises, etc. In tire uniformity testing these errors are reduced by synchronized sampling of the data with respect to a tire's revolution, by time and frequency domain averaging of the signals, and by improving the resolution of the order spectra.

2) Synchronized or bias errors, also called machine contribution (MC), are systematic components of tire uniformity signals, caused by machine imperfections, such as spindle or wheel eccentricity, imbalance, etc. These components can be measured and subtracted from input data before it is used in Formula (1). This is usually a time consuming procedure, which requires a special methodology. Sometimes when a test is finished, and a machine is retooled, there is no way for the related MC to be found. In other cases, we need to correlate data from two machines without access to one or both of them for explicit measurement, and remove the machine contribution.

To address these problems, and to improve the data quality, even when the MC is not measured explicitly, the following method is proposed.

Assuming, that every input and output signal has some level of the MC or bias, Formula (1) can be re-written by adding the bias terms to every input and output, as follows:

$$Y + B_Y = \sum_{i=1}^{n} H_i * (X_i + B_i) \quad (2)$$

Where
   $B_Y$ is a machine contribution, or bias, included in the output signal
   $B_i$ is a machine contribution, or bias, included in an input signal
   The bias terms are assumed to be constant for a given tire construction, test conditions and machine combination.

For the three input case, the Formula (2) becomes:

$$Y+B_Y=H_1*(X_1+B_1)+H_2*(X_2+B_2)+H_3*(X_3+B_3)$$

Opening the parentheses and re-arranging the terms for the three-input case, gives us the following formula:

$$Y=H1*X1+H2*X2+H3*X3+(H1*B1+H2*B2+H3*B3-BY)$$

or $$Y=H1*X1+H2*X2+H3*X3+B,$$

where
   $B=H_1*B_1+H_2*B_2+H_3*B_3-B_Y$ is the total bias or machine contribution of the measurement system.

The total bias contains individual biases of the inputs, multiplied by respective transfer functions, and also the bias of the output.

Let's consider the three-input-one-output system, with the following inputs and outputs:
   Input 1: Low Speed 1-st Harmonics of the Radial Force Variation, measured in Newtons
   Input 2: Low Speed 1-st Harmonics of the Instantaneous Rolling Radius Variation, measured in Meters
   Input 3: Imbalance, measured in Kilograms of mass Output: High Speed 1-st Harmonics of the Tangential Force Variation, measured in Newtons The biases of the inputs and output have the same units as the corresponding inputs and outputs. So to be included into the total bias, they have to be affected by the corresponding transfer functions, having the following units:

H1: Newton/Newton

H2: Newton/Meter

H3: Newton/Kilogram

The bias of output has the same units as the output itself, which in this case is Newtons.

The essence of the proposed method is in finding the bias terms simultaneously with the transfer functions by using the same input-output data, but fitting the data to extended input-output models, which include the bias terms.

Figure 2:
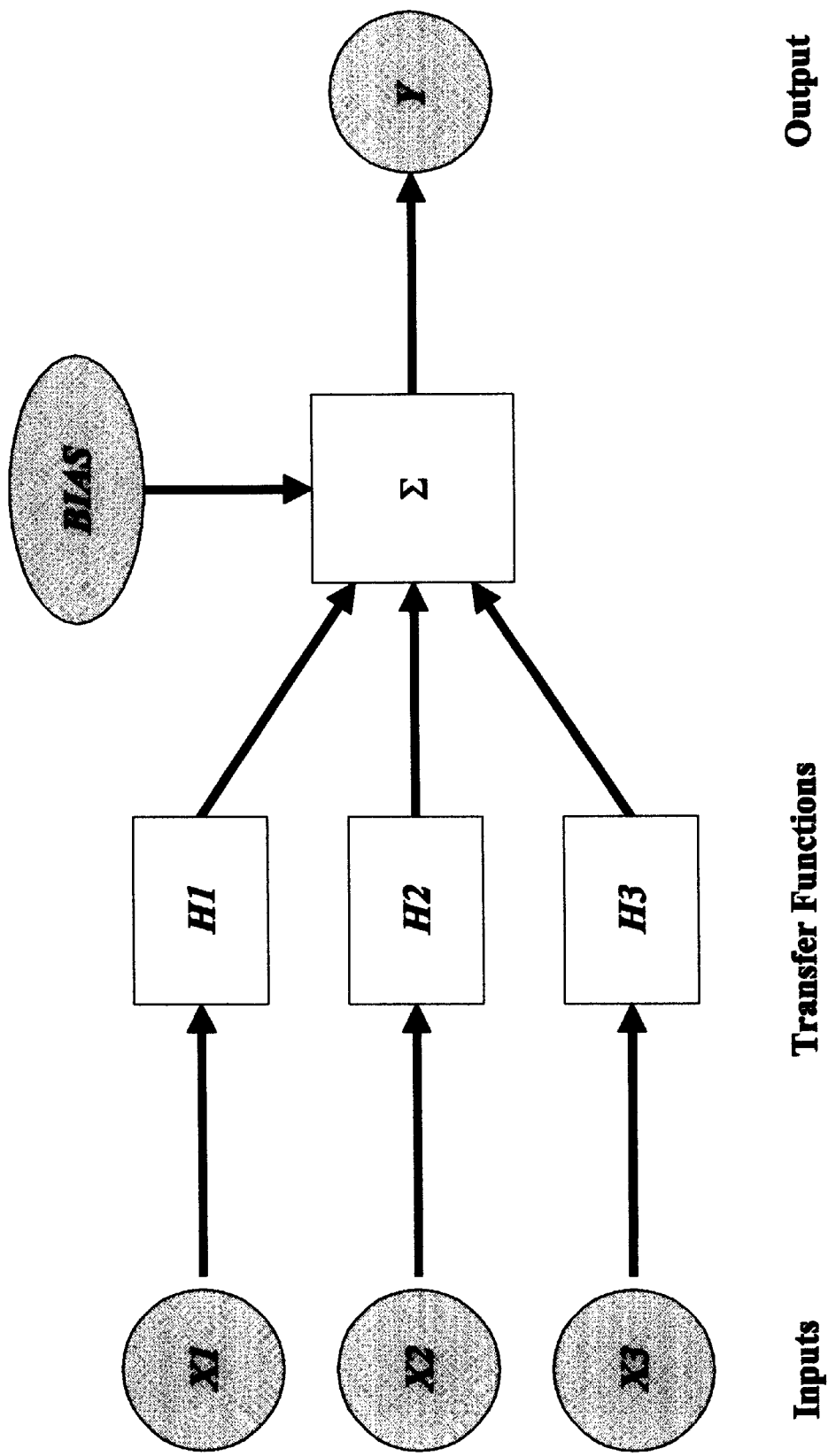
FIG. 2 illustrates a block diagram of the method of the invention for predicting HSU.

The new approach is illustrated by the block-diagram of FIG. 2.

The bias term of FIG. 2 may include both input and output terms as shown in Formula (2). Frequently we do not know the exact sources of different contributions, but by finding the combined bias term, and correcting the results for bias, we may substantially improve the quality of the resulting uniformity data.

In another application of the invention, if we know one of two data sets from two different machines is coming from a well tuned machine with a very low bias ($X_1$ is clean and $B_1$=0), then the bias can be attributed to the second machine, and the BIAS=−BY. Knowledge of the bias amplitude and source can be used for tuning the machine.

The model, described by Formula (2), is a general one, and can be applied to the cases at hand. For example, if two uniformity machines are correlated, a single-input-single-output case is used. For the prediction of high speed radial force variation, we use two inputs, namely low speed radial force variation and tire imbalance. Finally, to predict the high speed tangential force variation, three inputs and one output are used, where the three inputs are radial force variation, instantaneous rolling radius, and tire imbalance.

The invention is further illustrated with reference to the following examples.

EXAMPLE 1

Software Implementation and Procedure

To implement the proposed method, a computer program BIAS SOLVER 1.xls has been developed in Excel and Visual Basic.

The program:

(1) identifies the transfer functions and bias for a given combination of inputs and an output;

(2) calculates the predicted or recovered output parameters based on the inputs, transfer functions and the bias; and (3) assesses the closeness of the measured and calculated output parameters in terms of the Standard Error of Prediction, Slope, and the Coefficient of Determination, $R^2$.

The program works as follows:

Complex inputs and output arrays are used in pairs to calculate preliminary (seed) values of the transfer functions A seed value of bias is set.

The inputs are multiplied by respective seed transfer functions, added together, and the seed bias is added per Formula (2), producing a vector of predicted output values.

The vector of predicted output values is subtracted from the vector of measured output values, producing the complex vector of error.

The real and imaginary components of the vector of errors are squared and added together to form the overall error.

The goal of the iteration process, which follows, is to minimize the overall error. This is achieved by simultaneously varying the transfer functions and the bias.

The iteration process is stopped when the lowest overall error is obtained. At this point the last values of the transfer functions and the bias are reported.

The final values of the transfer functions and the bias are used to calculate the final values of the output vector.

The accuracy of the result is assessed by calculating the standard error of prediction and the coefficient of determination $R^2$ between the final predicted and measured output vectors.

With reference to the Excel Spreadsheet illustrated in FIG. 3, the program is used as follows:

Fill the columns A to H starting from row 16 with at least one input and one output array of measured harmonics of the tire uniformity data (at least the four columns: A, B, G, and H have to be filled).

Click on the button "Find Transfer Functions", and select the calculation with or without the bias term.

The table Control Parameters displays H1, H2, H3, Bias, Standard Error, Slope and $R^2$.

Predicted or recovered output uniformity parameters are placed in columns J and K, starting from row 16.

Referring to FIG. 3, columns A to F contain the inputs and columns G and H contain the output, all in the magnitude/phase format. The inputs and output could be harmonics of various signals, measured on the uniformity machines: force, moment, run-out, angular velocity variations, etc. The figure shows a 3 input/1 output case with 10 tires (10 lines). The left top table shows the seed values for the transfer functions H1, H2 and H3 in magnitude and phase format, the real and imaginary components being shown to the right of the table. The next two small tables show the qualifiers of calculation: Slope, Standard Error and $R^2$, and the found bias in both Magnitude/Phase and Real/Imaginary format. The last table to the right shows the calculated Transfer Functions, bias, Slope, Standard Error and $R^2$.

The columns to the right of the output data show the predicted/recovered tire uniformity data.

The minimum recommended sample size is 7. For correlations done to date, for a lower number of tires, the Excel solver routines do not converge to the optimal solutions.

EXAMPLE 2

Simulated Data

The new method has been applied to four groups of data: (1) simulated, which represents one, two or three random input and a single output vector (magnitudes and phases) with added known bias and noise terms; (2) correlation data collected on two high speed uniformity machines; (3) low-to-high speed uniformity prediction data for the R1H case, and (4) controlled balance and run-out test data (R1H and T1H), collected for a group of 7 tires on a HSU machine.

The simulated data was generated by an EXCEL program BIAS GENERATOR 1.xls, specially written for the study. Table 1 contains the results of a number of simulations, including 1, 2 or 3 input cases with ideal, biased, and noisy output.

The left column of Table 1 lists the calculated parameters, which include transfer functions H1, H2, H3, bias, Standard Error, Slope and $R^2$. The next column contains the expected values of the parameters. They are included for the comparison with the actually calculated parameters. Columns 3 and 4 contain the results of the calculations for the no bias and bias models. And the last two columns contain the results for the output, contaminated by both bias and random noise. The added random noise has a severe level of 20% of the output.

Results of the 1-Input/1-Output case show very good recovery of the transfer functions and bias terms for both bias and bias+noise cases when the bias model is used, "recovery" referring to separating the real test data attributed to the product from the accumulated data recorded during the test. The transfer functions H1 are found as 1.41 @ 45° and 1.46 @ 43°, respectively, compared to the expected 1.41 @ 45°. The bias component, expected to be 42.4 @ 315° was recovered to 42.43 @ 315° and to 41.15 @ 313° respectively.

The resulting improvement in the correlation $R^2$ between the "spoiled" to ideal results is from 0.675 to 1.0 and from 0.395 to 1.0, respectively.

The results for 2 and 3 input cases are following the same trends, with the complete recovery of all the parameters for the bias-only case and very reasonable recovery of the parameters for the case with added severe noise.

The outcome of the simulation was encouraging enough to proceed with the analysis of actual test data from correlation, prediction and controlled uniformity tests.

EXAMPLE 3

Correlation of Two HSU Machines

Table 2 contains the results of applying the bias method to improve correlation of the data from two HSU machines. The data used is old data from previous testing, and was used because of the sample size of 40 tires and wide spread of the R1H magnitudes.

TABLE 2

Bias Method In Machine Correlation
Correlation of R1H:HSU*1 & HSU*2

| Parameter | No Bias Model | | Bias Model | |
| --- | --- | --- | --- | --- |
| H1 | 1.26 | 345° | 1.31 | 349° |
| H2 | | | | |
| H3 | | | | |
| Bias | 0.00 | 0° | 19.06 | 171° |
| Std Error | 16.79 | | 14.78 | |
| Slope | .088 | | .097 | |
| $R^2$ | 0.7821 | | 0.8516 | |

Comparison of the results for the no bias and bias models shows improvement for the bias model in all three parameters: reduced Standard Error, Slope much closer to 1.0, and increased $R^2$: from 0.7821 to 0.8516.

The results, while not as spectacular as for the simulated data, support the validity of the method to improve correlation between machines, and quality of the uniformity data.

The 10% improvement here was achieved by recalculating using the bias model, without any investment in equipment, and with no new testing.

EXAMPLE 4

Bias Method in Uniformity Prediction

The following Table 3 shows how the bias method improved prediction of the high speed radial first harmonics (R1H) for three combinations of low and high speed uniformity machines. In each case the two inputs were R1H at 60 rpm and balance.

TABLE 3

Bias Method In High Speed Prediction (HSP)

| Parameter | No Bias Model | | Bias Model | |
| --- | --- | --- | --- | --- |
| HSP:LSU*1 to HSU*3, R1H:60 to 1033 rpm | | | | |
| H1 | 5.80 | 187° | 5.62 | 1.86° |
| H2 | 0.70 | 352° | 0.77 | 360° |
| H3 | | | | |
| Bias | 0.00 | | 12.51 | 0° |
| Std Error | 22.21 | | 18.43 | |
| Slope | 0.81 | | 0.84 | |
| $R^2$ | 0.8658 | | 0.9104 | |
| HSP:LSU*2 to HSU*2, R1H:60 rpm/140 kph | | | | |
| H1 | 1.40 | 341° | 1.24 | 339° |
| H2 | 1.30 | 332° | 1.44 | 340° |
| H3 | | | | |
| Bias | 0.00 | 0° | 17.58 | 204° |
| Std Error | 20.54 | | 18.23 | |
| Slope | 0.78 | | 0.82 | |
| $R^2$ | 0.6550 | | 0.7287 | |
| HSP:LSU*2 to HSU*1, R1H:60 rpm/140 kph | | | | |
| H1 | 1.12 | 352° | 1.18 | 351° |
| H2 | 0.86 | 346° | 0.75 | 347° |
| H3 | | | | |
| Bias | 0.00 | 0° | 9.88 | 310° |
| Std Error | 13.03 | | 12.03 | |
| Slope | 0.80 | | 0.82 | |
| $R^2$ | 0.7568 | | 0.7931 | |

The following machine combinations were used: LSU*1 low speed machine with HSU*3, LSU*2 low speed machine to HSU*2, and LSU*2 to HSU*1.

The results show a consistent improvement in the prediction parameters: reduced Standard Error, improved Slope and increased $R^2$.

EXAMPLE 5

Controlled Balance and Runout Tests

This example uses data obtained from a special HSU test, where 7 tire/wheel assemblies were tested 3 times, as follows:

(1) Master test: assemblies tested with regular warm up, physical balancing and Radial and Tangential Force Variation measured at 6 speeds from 60 to 1033 rpm under a nominal load and inflation pressure conditions. The test represented a bias free machine.

(2) Balance test: same as (1), but a known mass of 40 gram was attached to the inner part of the rim at 60° from the DOT reference point clockwise. This provided a mass bias to be found by the new method.

(3) Runout test: same as (1), but the wheel was shifted off center of rotation by placing a 0.050" shim against the expanding centering collet at 252° from the DOT reference point clockwise. This introduced a geometrical bias, which, it was hoped, would be found by the new method.

Figure 4:
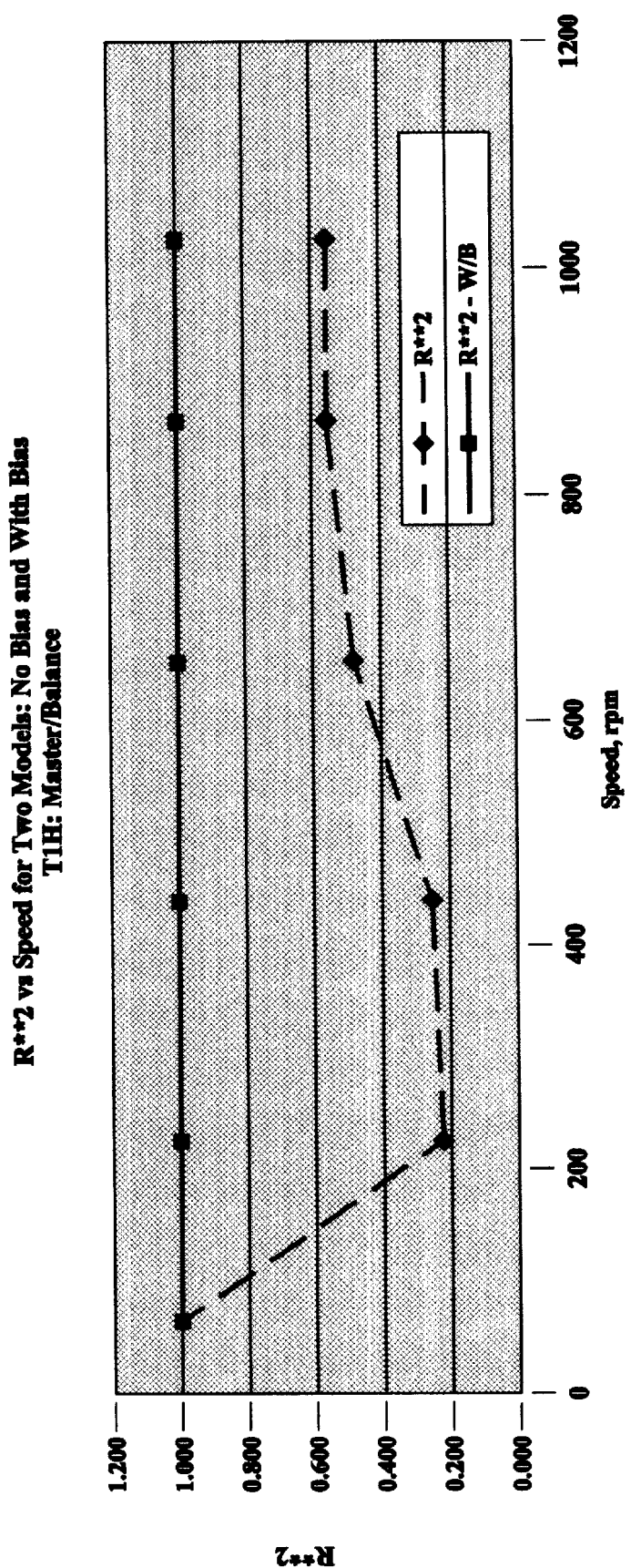
FIGS. 4 to 9 illustrate graphically the correlation of two sets out of data without application of a bias model compared to the correlation of the same data where the bias model is applied.
Figure 5:
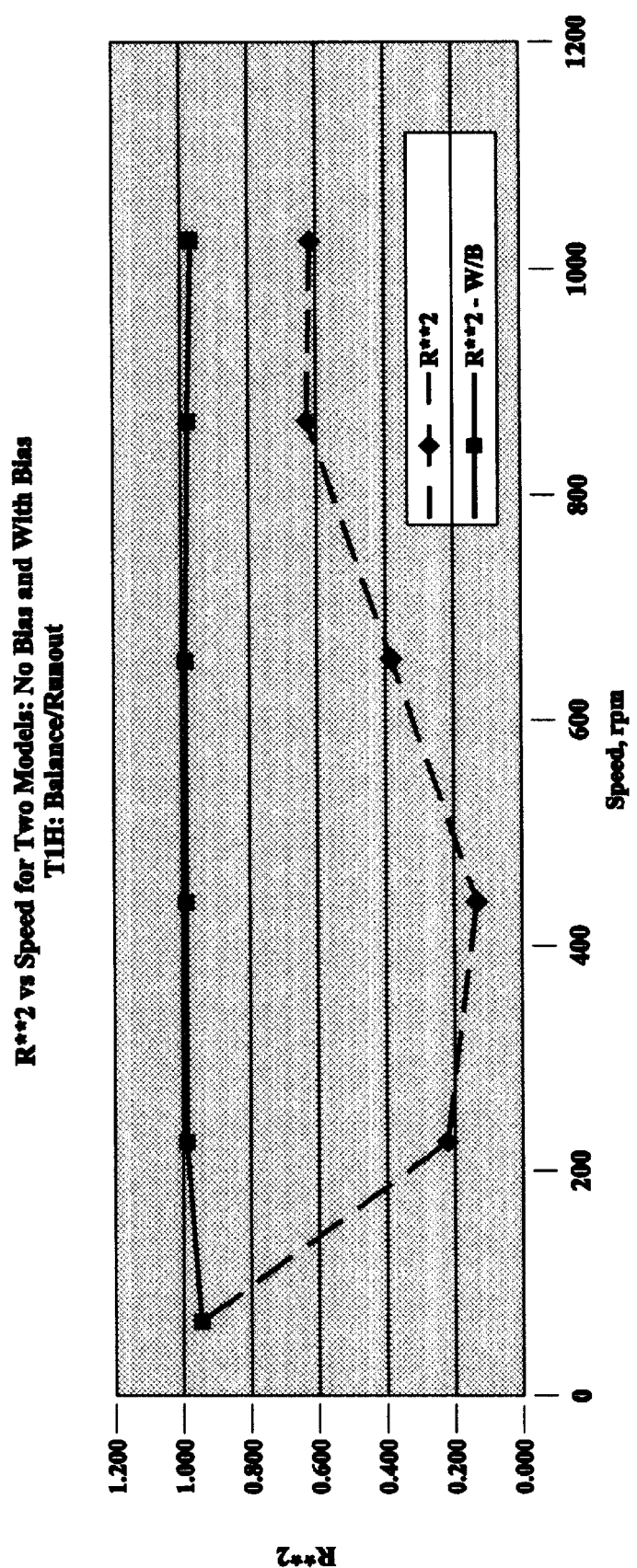
Figure 6:
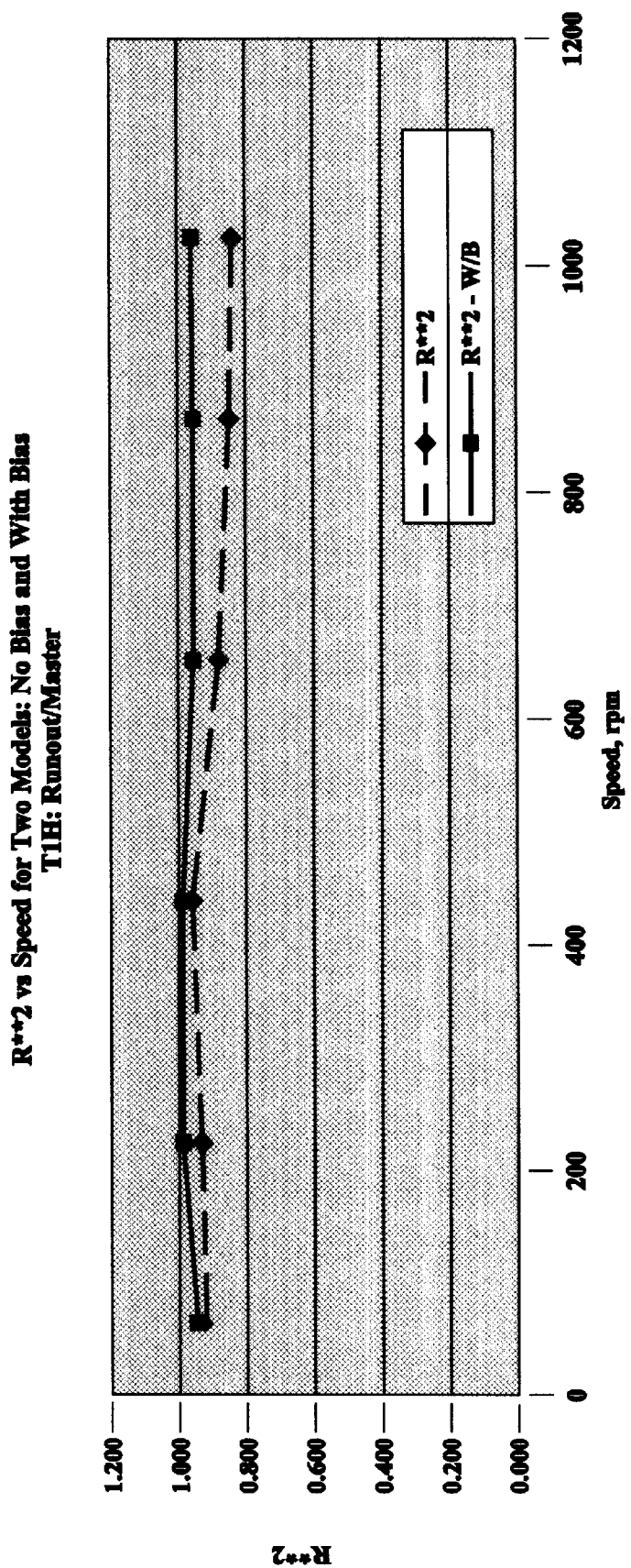
Figure 7:
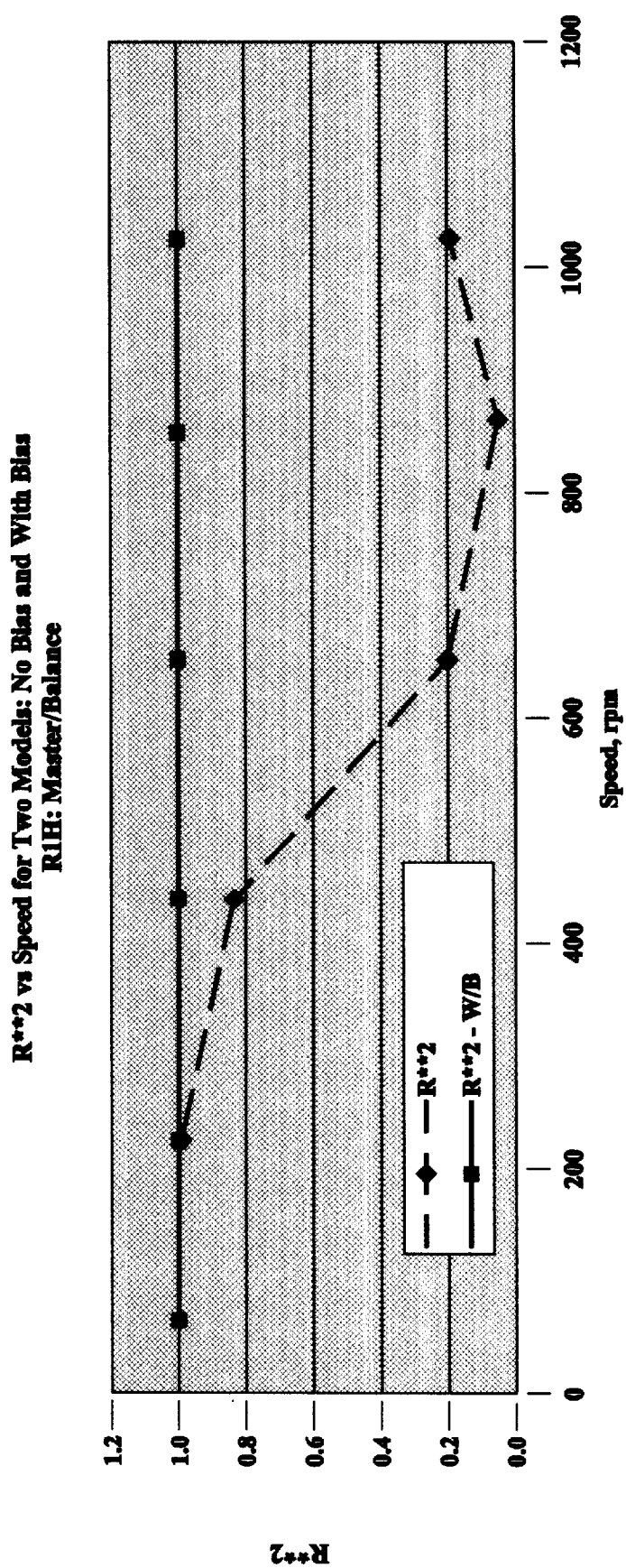
Figure 8:
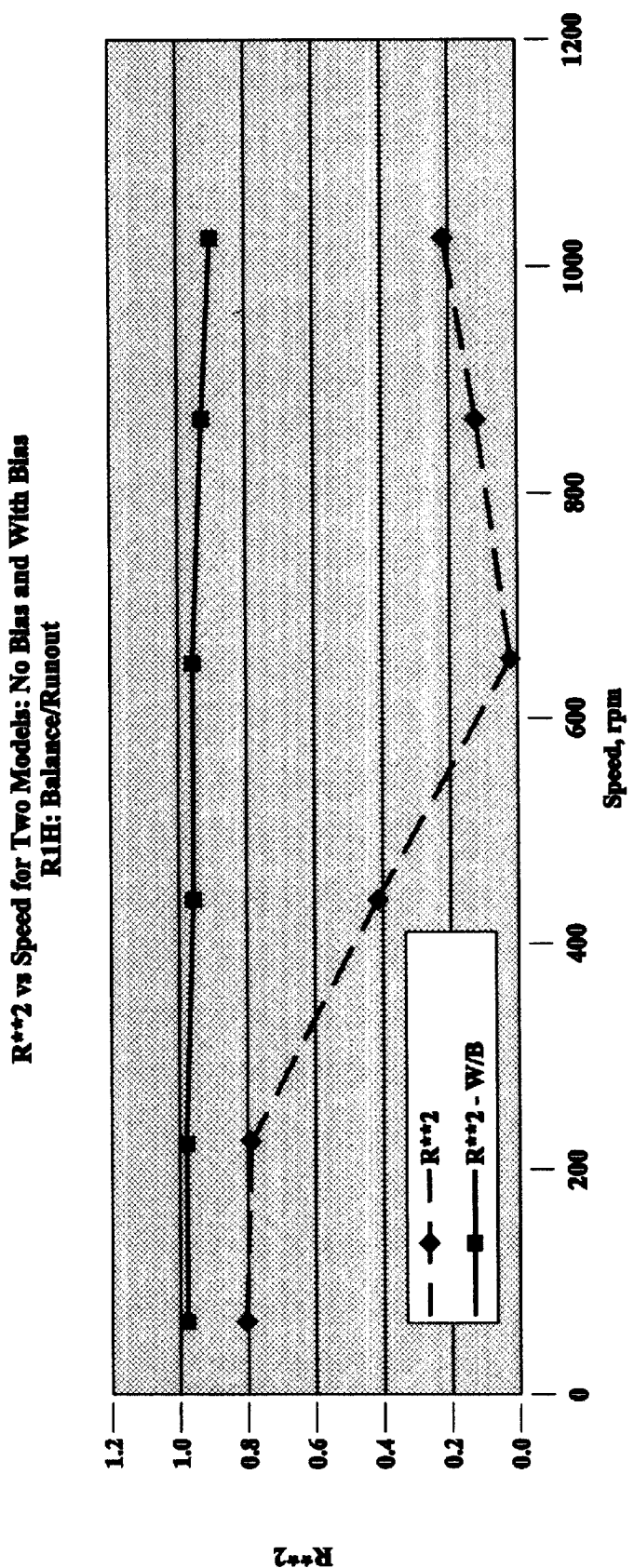
Figure 9:
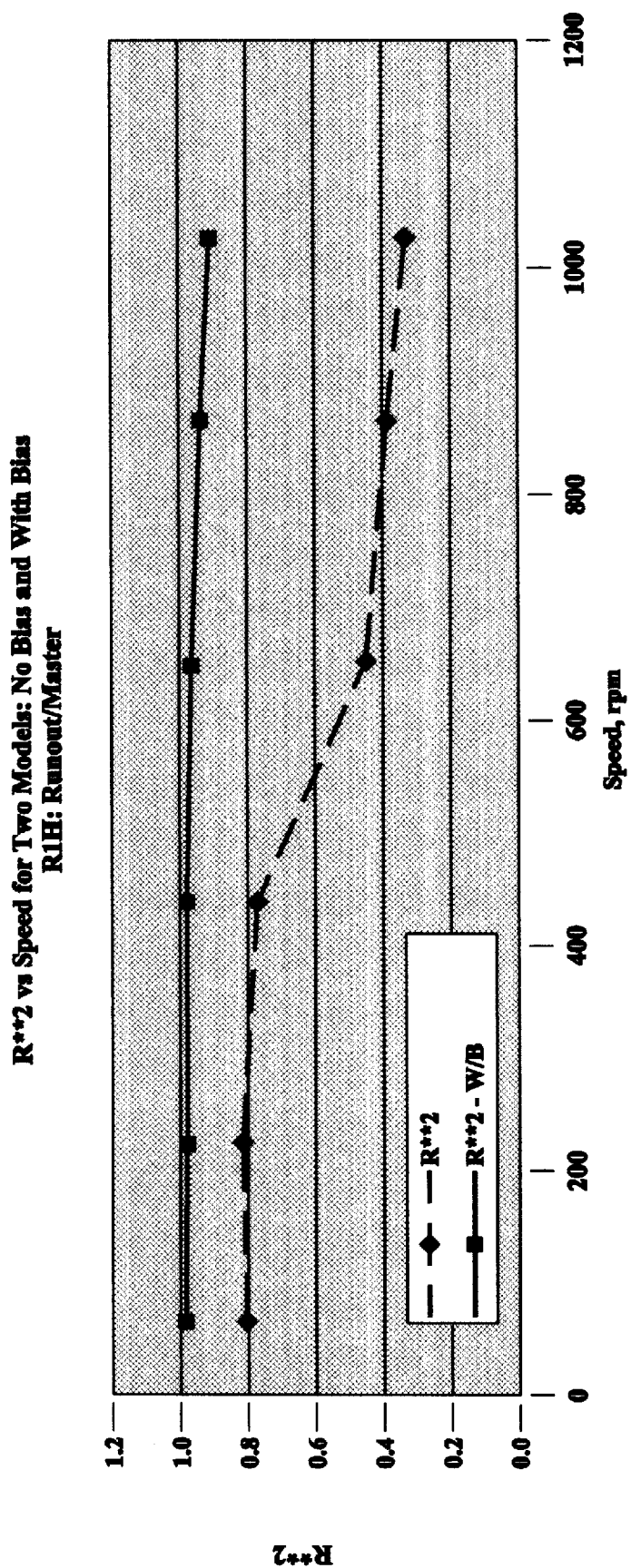

1-input-1 output model was used for the three combinations: Master-Balance, Balance-Runout, and Runout-Master applying no bias and bias models. The multi-speed results for R1H and T1H are shown in Tables 4-a and 4-b and FIGS. 4 and 9.

TABLE 4a

R1H Results for Three I/O Combinations. No-Bias and Bias Models

| Input/Output | Model | Speed, rph | 60 | 224 | 447 | 669 | 891 | 1033 |
|---|---|---|---|---|---|---|---|---|
| Master/ | No Bias | H1, Mag | 1.00 | 0.93 | 0.75 | 0.58 | 0.63 | 0.89 |
| Balance | | Bias, Mag | 0.00 | 0.00 | 0.00 | 0.00 | 0.00 | 0.00 |
| | | St. Error, N | 0.67 | 2.27 | 8.62 | 14.96 | 18.47 | 24.79 |
| | | R**2 | 0.999 | 0.993 | 0.837 | 0.197 | 0.039 | 0.192 |
| | With Bias | H1, Mag | 1.01 | 1.00 | 1.00 | 1.01 | 1.01 | 1.01 |
| | | Bias, Mag | 1.18 | 9.44 | 36.62 | 81.90 | 145.51 | 197.52 |
| | | St. Error, N | 0.55 | 0.39 | 0.52 | 0.44 | 0.71 | 0.84 |
| | | R**2 | 1.000 | 1.000 | 1.000 | 1.000 | 0.999 | 0.999 |
| Balance/ | No Bias | H1, Mag | 0.75 | 0.79 | 0.94 | 0.79 | 0.25 | 0.34 |
| Runout | | Bias, Mag | 0.00 | 0.00 | 0.00 | 0.00 | 0.00 | 0.00 |
| | | St. Error, N | 13.31 | 14.71 | 21.91 | 23.26 | 5.37 | 7.23 |
| | | R**2 | 0.607 | 0.596 | 0.418 | 0.021 | 0.118 | 0.218 |
| | With Bias | H1, Mag | 1.04 | 1.04 | 0.96 | 1.05 | 1.02 | 0.99 |
| | | Bias, Mag | 30.18 | 27.82 | 32.81 | 77.87 | 142.67 | 193.95 |
| | | St. Error, N | 3.32 | 3.70 | 4.62 | 4.85 | 6.40 | 7.57 |
| | | R**2 | 0.974 | 0.970 | 0.945 | 0.952 | 0.918 | 0.890 |
| Runout/ | No Bias | H1, Mag | 1.05 | 1.04 | 1.07 | 1.02 | 1.00 | 1.00 |
| Master | | Bias, Mag | 0.00 | 0.00 | 0.00 | 0.00 | 0.00 | 0.00 |
| | | St. Error, N | 10.52 | 10.16 | 11.11 | 10.64 | 10.79 | 11.37 |
| | | R**2 | 0.609 | 0.616 | 0.579 | 0.449 | 0.385 | 0.337 |
| | With Bias | H1, Mag | 0.95 | 0.95 | 1.03 | 0.96 | 0.97 | 0.98 |
| | | Bias, Mag | 29.14 | 29.47 | 30.73 | 33.10 | 35.09 | 36.84 |
| | | St. Error, N | 3.77 | 4.29 | 4.34 | 6.16 | 7.73 | 9.03 |
| | | R**2 | 0.979 | 0.973 | 0.976 | 0.949 | 0.928 | 0.912 |

TABLE 4b

T1H Results for Three I/O Combinations. No-Bias and Bias Models

| Input/Output | Model | Speed, rph | 60 | 224 | 447 | 669 | 891 | 1033 |
|---|---|---|---|---|---|---|---|---|
| Master/ | No Bias | H1, Mag | 0.97 | 1.29 | 2.15 | 2.08 | 2.12 | 2.13 |
| Balance | | Bias, Mag | 0.00 | 0.00 | 0.00 | 0.00 | 0.00 | 0.00 |
| | | St. Error, N | 0.19 | 2.94 | 13.50 | 24.14 | 49.01 | 72.70 |
| | | R**2 | 0.993 | 0.213 | 0.246 | 0.462 | 0.551 | 0.558 |
| | With Bias | H1, Mag | 1.07 | 1.00 | 1.01 | 1.01 | 1.01 | 1.01 |
| | | Bias, Mag | 1.09 | 9.33 | 36.44 | 81.20 | 144.46 | 196.86 |
| | | St. Error, N | 0.09 | 0.08 | 0.19 | 0.37 | 1.13 | 1.77 |
| | | R**2 | 0.999 | 0.998 | 0.999 | 1.000 | 0.999 | 0.999 |
| Balance/ | No Bias | H1, Mag | 0.80 | 0.42 | 0.21 | 0.27 | 0.31 | 0.32 |
| Runout | | Bias, Mag | 0.00 | 0.00 | 0.00 | 0.00 | 0.00 | 0.00 |
| | | St. Error, N | 0.58 | 0.63 | 1.49 | 4.61 | 10.23 | 15.36 |
| | | R**2 | 0.922 | 0.219 | 0.119 | 0.183 | 0.226 | 0.217 |
| | With Bias | H1, Mag | 1.01 | 0.95 | 0.99 | 1.01 | 1.00 | 1.00 |
| | | Bias, Mag | 2.26 | 9.02 | 38.72 | 90.45 | 166.17 | 230.39 |
| | | St. Error, N | 0.40 | 0.20 | 0.82 | 2.37 | 5.28 | 8.08 |
| | | R**2 | 0.964 | 0.990 | 0.989 | 0.984 | 0.981 | 0.978 |
| Runout/ | No Bias | H1, Mag | 1.25 | 1.16 | 1.03 | 1.02 | 1.02 | 1.00 |
| Master | | Bias, Mag | 0.00 | 0.00 | 0.00 | 0.00 | 0.00 | 0.00 |
| | | St. Error, N | 0.68 | 0.55 | 1.57 | 5.83 | 13.17 | 19.08 |
| | | R**2 | 0.944 | 0.939 | 0.957 | 0.896 | 0.875 | 0.870 |
| | With Bias | H1, Mag | 0.90 | 1.02 | 1.02 | 1.01 | 1.01 | 1.01 |
| | | Bias, Mag | 2.36 | 1.05 | 2.52 | 9.16 | 21.63 | 35.08 |
| | | St. Error, N | 0.39 | 0.26 | 1.10 | 2.94 | 6.23 | 8.59 |
| | | R**2 | 0.972 | 0.989 | 0.974 | 0.964 | 0.967 | 0.973 |

The parameters, reported in Tables 4-a and 4-b are mostly the same as in the three previous analyses: Transfer Functions (magnitudes only included), bias (magnitudes only), Standard Error, and $R^2$. The results are reported for all 6 test speeds. Only Counter-Clockwise data is used, but the results are very similar for the Clockwise direction of tire rotation. The following observations are made for the input-output combinations used.

Master/Balance

The bias no-model produces Transfer Function magnitudes which start at expected values of 1.0 at 60 rpm, but deviate substantially with increased speed, dropping to 0.58 at 669 rpm.

The bias no-model produces Standard Error which increases with speed from 0 to 24.79 N, while the $R^2$ between the input and output data deteriorates from 0.999 to 0.192.

The bias model restores the Transfer Function to values around 1.0 for all speeds, producing the bias term, which represents the machine contribution of the added 40 gram mass. The Standard Error never exceeds 1.0 N, and the $R^2$ holds a level of 0.999 to 1.000 for all speeds.

It should be added that the detected bias magnitude grows in proportion to the square of the angular velocity of the tire, as expected from the mass imbalance term.

Balance/Runout

This case represents two imperfect machines, and the trends are very close to those of the previous case, with a slight difference in magnitude of the bias term and its phase (not included in the table) due to the fact that we encounter two sources of bias.

Standard Error for the bias model is higher than in the previous case, but it is substantially reduced as compared to the no bias model. $R^2$ recovers from the level of 0.6–0.02 to the range of 0.974 to 0.89.

Runout/Master

Here the runout-related bias term is not as strong as the mass imbalance term of the previous two cases, leaving the Transfer Function at a steady level close to 1.0 for all speeds for the two models.

Standard Error shows a slight advantage for the bias model, but the real improvement is achieved for $R^2$, which for 1033 rpm recovers from 0.337 to 0.912.

An interesting result is a linear trend with speed in the magnitude of the bias term, caused by the geometrical runout. Here we observe both a slight stiffening of the tire with increased rpm and slight amplification of force transferred from the footprint to the spindle of the HSU machine.

The same trends are found for the T1H results, with differences only in the runout-related bias term, starting from a very low level at 60 rpm, due to the nature of the force transfer in the tangential direction.

Tables 4-a and 4-b show only $R^2$ and its changes with speed for the two models used.

Overall, results for the controlled balance and runout-related bias testing provide a complete validation of the new method.

The data is illustrated graphically in FIGS. 4 to 9.

While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method for isolating test machine contribution using sample data from a manufactured product comprising the steps of:

collecting first measurement data on a product sample on a first machine at a first condition taken from a condition set comprising speed, load, and pressure;

collecting second measurement data for the product sample on a second machine at said second condition;

establishing transfer functions from the first measurement data and the second measurement data and simultaneously calculating a bias term representing isolated test machine contribution to the data;

collecting third measurement data for product using the first condition; and predicting the products performance for the second condition by applying the transfer function and bias term to said third measurement data.

2. A method for predicting a harmonic component of force variation comprising the steps of:

collecting a first set of measurement data for a tire sample on a factory floor balance checker, and on a factory floor tire uniformity machine which is operated at a first speed;

collecting a second set of measurement data for the tire sample on a test lab tire uniformity machine which is operated at a second speed higher than the first speed, determining transfer functions and a bias term from the first set of measurement data and the second set of measurement data;

collecting a third set of measurement data for a production tire on a factory floor balance checker and on a factory floor tire uniformity machine operating at the first speed; and predicting a harmonic component of force variation for a production tire rotating at a second speed by applying the transfer functions and bias term to the third set of measurement data.

3. A method according to claim 2, characterized by the step of:

selecting the tire sample as a sample set of one or more tires of the same construction which is substantially the same as the construction of the production tire for which prediction is desired.

4. A method according to claim 2, characterized by the step of:

collecting the first set of measurement data on a factory floor balance checker which determines single plane balance in terms of single plane net imbalance mass and rotational angular location of the net imbalance mass.

5. A method according to claim 2, characterized by the step of:

collecting the first set of measurement data on a factory floor balance checker which determines two plane balance in terms of a net imbalance mass and rotational angular location of the net imbalance mass for each of two circumferential planes of the tire being balance checked.

6. A method according to claim 2, characterized by the step of:

collecting the third set of measurement data for the production tire on the same factory floor balance checker and on the same factory floor tire uniformity machine as were used collecting the first set of measurement data for the tire sample; and collecting the third set of measurement data while operating the factory floor tire uniformity machine at said first speed.

7. A method of correlating test data, measured on more than one machine, which includes:

measuring more than one set of data on the same sample of test articles under the same test conditions;

calculating transfer functions and bias between the more than one set of data;

calculating the coefficient of determination (the square of correlation coefficient) $R^2$ between a first set of test data and at least a second set of the data corrected by removing the bias term.

8. A method of tuning a test machine comprising:

using a machine contribution bias from two sets of data measured on a highly precise master machine and the test machine as a means of determining the precision of the test machine;

adjusting the test machine until the bias level with respect to the master machine produces a target accuracy.

9. A method of tuning a test machine of claim 8 comprising:

analyzing changes in the bias term as correlated with changes in test speed wherein when the bias is growing in proportion to the square of the rotational velocity of the machine, then an unbalance exists in the machine and wherein if bias is growing with speed in a linear fashion, there is a geometrical imperfection in the test machine.

* * * * *